(12) United States Patent
Yamazaki

(10) Patent No.: US 8,818,447 B2
(45) Date of Patent: Aug. 26, 2014

(54) RADIO COMMUNICATION SYSTEM, RADIO TERMINAL, AND RADIO COMMUNICATION METHOD

(75) Inventor: Chiharu Yamazaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 445 days.

(21) Appl. No.: 13/321,946

(22) PCT Filed: May 27, 2010

(86) PCT No.: PCT/JP2010/059042
§ 371 (c)(1),
(2), (4) Date: Nov. 22, 2011

(87) PCT Pub. No.: WO2010/137666
PCT Pub. Date: Dec. 2, 2010

(65) Prior Publication Data
US 2012/0071199 A1 Mar. 22, 2012

(30) Foreign Application Priority Data
May 27, 2009 (JP) .................................. 2009-128169

(51) Int. Cl.
*H04B 7/00* (2006.01)

(52) U.S. Cl.
USPC .......... 455/524; 455/500; 455/562.1; 375/260

(58) Field of Classification Search
CPC .... H04B 7/024; H04B 7/0452; H04B 7/0417; H04B 7/0621; H04B 7/0671; H04B 7/0413; H04L 27/2626; H04L 2025/03426; H04W 88/08; H04W 24/00; H04W 88/02; H04W 92/20
USPC .......... 455/63.1, 67.13, 114.2, 296, 501, 522, 455/562.1, 500, 450, 451, 452.1, 453, 455/550.1, 524; 370/328, 329, 431, 445, 370/341, 345, 346, 252; 375/267, 299, 260, 375/259, 265, 286, 354, 356
See application file for complete search history.

(56) References Cited

U.S. PATENT DOCUMENTS 8,396,153 B1 3/2013 Shen et al.
8,457,008 B2 * 6/2013 Lim et al. ...................... 370/252
(Continued)

FOREIGN PATENT DOCUMENTS

CN 1909437 A 2/2007
CN 101095296 A 12/2007
(Continued)

OTHER PUBLICATIONS

An Office Action issued by the Chinese Patent Office on Nov. 26, 2013, which corresponds to Chinese Patent Application No. 201080023649.5 and is related to U.S. Appl. No. 13/321,946; with English language concise explanation.

(Continued)

*Primary Examiner* — Sujatha Sharma
(74) *Attorney, Agent, or Firm* — Studebaker & Brackett PC

(57) ABSTRACT

A radio communication system (1) has: a radio terminal (UE); a radio base station (BS1) which transmits radio signals (RS1) to the radio terminal (UE) corresponding to the feedback from the radio terminal (UE); and a radio base station (BS2) which transmits, corresponding to the feedback from the radio terminal (UE), radio signals (RS2) to the radio terminal (UE) at the frequency and time identical to the frequency and time at which the radio signals (RS1) are transmitted. The time interval at which the radio terminal (UE) performs the feedback to the radio base station (BS1) is longer than the time interval at which the radio terminal (UE) performs the feedback to the radio base station (BS2).

15 Claims, 9 Drawing Sheets

(56) References Cited

U.S. PATENT DOCUMENTS

| | | |
|---|---|---|
| 2006/0120477 A1 | 6/2006 | Shen et al. |
| 2006/0256805 A1 | 11/2006 | Cho et al. |
| 2008/0260064 A1 | 10/2008 | Shen et al. |
| 2009/0161605 A1 | 6/2009 | Shen et al. |
| 2010/0309996 A1* | 12/2010 | Lim et al. ............... 375/260 |
| 2013/0195000 A1 | 8/2013 | Shen et al. |
| 2013/0237212 A1* | 9/2013 | Khayrallah et al. ......... 455/423 |
| 2014/0010159 A1* | 1/2014 | Davydov et al. ............ 370/328 |

FOREIGN PATENT DOCUMENTS

| | | |
|---|---|---|
| JP | 2008-523665 A | 7/2008 |
| JP | 2010-045783 A | 2/2010 |
| WO | 2006/063138 A2 | 6/2006 |

OTHER PUBLICATIONS

Motohiro Tanno et al., Coordinated Multiple-point Transmission/Reception and Relay Techniques for LTE-Adbanced, 2009 IEICE General Conference; Mar. 17-20, 2009; pp. SS25-SS26; The Institute of Electronics, Information and Communication Engineers, Japan; with translation.

Motorola, Spatial Correlation Feedback to Support LTE-A MU-MIMO and CoMP: System Operation and Perfomance Results; 3GPP TSG_RAN WG1 Meeting #57, R1-092221, San Francisco, USA; May 4-8, 2009; pp. 1-11.

LG Electronics, UE Measurement and Feedback for DL CoMP; 3GPP TSG RAN WG1 Meeting #56bis, R1-091193, Seoul, Korea; Mar. 16-20, 2009; pp. 1-3.

* cited by examiner (a)

(b)

(a)

(b)

RADIO COMMUNICATION SYSTEM, RADIO TERMINAL, AND RADIO COMMUNICATION METHOD

TECHNICAL FIELD

The present invention relates to a radio communication system to which coordinated base station MIMO communications are applied, and also relates to a radio terminal and a radio communication method.

BACKGROUND ART

MIMO (Multi-Input Multi-Output) communications have conventionally been known as a technique capable of improving the frequency usage efficiency in a radio communication system. In the MIMO communications, multiple signal sequences are transmitted at the same frequency and time while each of the transmission side and reception side of radio signals uses multiple antennas.

In order to exert the performance of MIMO communications, transmission control needs to be adaptively performed in accordance with the state of a radio channel. For this reason, closed-loop control is introduced into a radio communication system into which MIMO communications are introduced. To put it more specifically, the reception side of radio signals generates channel information in accordance with characteristics of a radio channel (hereinafter, referred to as "channel characteristics") and feeds back the channel information to the transmission side. Feedback of the channel information is required in a radio communication system employing an FDD scheme, in particular, in which there is no correlation in the channel characteristics between the uplink and downlink.

In recent years, coordinated base station MIMO communications (also termed as "coordinated multi-cell transmission/reception") have attracted attention as a technique developed from MIMO communications. In the coordinated base station MIMO communications, multiple radio base stations communicate with a single radio terminal at the same frequency and time (refer to Patent Document 1, for example). Using antennas of multiple radio base stations, the coordinated base station MIMO communications can increase the number of antennas usable in MIMO communications, and thereby achieve an increase in the transmission speed and also an improvement in the reception quality as compared with conventional MIMO communications.

PRIOR ART DOCUMENT

Patent Document

PATENT DOCUMENT 1: Published Japanese Translation of PCT International Application No. 2008-523665

SUMMARY OF THE INVENTION

Problem to be Solved by the Invention

In the case of performing the closed-loop control in the coordinated base station MIMO communications, however, a radio terminal provides feedback to all of the multiple radio base stations, so that the overhead associated with the feedback increases as compared with the conventional MIMO communications. To put it more specifically, when feedback control channels are established between the radio terminal and the respective multiple radio base stations, the amount of consumption of radio resources increases in the uplink.

Instead, a feedback control channel may be established with only one radio base station among the multiple radio base stations; and the one radio base station may transfer the feedback to the other radio base stations through base-station communications. With this way, the overhead associated with the feedback may be reduced. In the case where the one radio base station transfers the feedback to the other radio base stations, however, the feedback may possibly not be transferred to the other radio base stations on time due to the influence of transfer delay. Thus, the coordinated base station MIMO communications may not function normally.

In this respect, an object of the present invention is to provide a radio communication system, a radio terminal and a radio communication method which can reduce the overhead associated with feedback while allowing coordinated base station MIMO communications to function normally.

The present invention has the following features to solve the problems described above. First of all, a first feature of the present invention is summarized as a radio communication system (radio communication system 1) comprising: a radio terminal (radio terminal UE); a first radio base station (radio base station BS1) configured to transmit a first radio signal (radio signal RS1) to the radio terminal in accordance with feedback from the radio terminal; and a second radio base station (radio base station BS2) configured to transmit a second radio signal (radio signal RS2) to the radio terminal in accordance with feedback from the radio terminal, at the same frequency and time as the first radio signal, wherein a time interval at which the radio terminal provides the feedback to the first radio base station is longer than a time interval at which the radio terminal provides the feedback to the second radio base station.

A second feature of the present invention is summarized in that, in the first feature of the present invention, the first radio base station updates a first transmission antenna weight (transmission antenna weight 1), used to control at least one of a phase and an amplitude of the first radio signal, in accordance with the feedback from the radio terminal, the second radio base station updates a second transmission antenna weight (transmission antenna weight 1), used to control at least one of a phase and an amplitude of the second radio signal, in accordance with the feedback from the radio terminal, and a time interval at which the first radio base station updates the first transmission antenna weight is longer than a time interval at which the second radio base station updates the second transmission antenna weight.

A third feature of the present invention is summarized in that, in the first feature of the present invention, during a period for which feedback to the first radio base station is omitted, the radio terminal provides the second radio base station with feedback based on first channel information (channel information 1) in accordance with a characteristic of a channel from the first radio base station to the radio terminal, and second channel information (channel information 2) in accordance with a characteristic of a channel from the second radio base station to the radio terminal.

A fourth feature of the present invention is summarized in that, in the third feature of the present invention, during the period for which feedback to the first radio base station is omitted, the radio terminal normalizes the second channel information by using the first channel information as a reference and feeds back the normalized second channel information to the second radio base station.

A fifth feature of the present invention is summarized in that, in the third feature of the present invention, during the period for which feedback to the first radio base station is omitted, the radio terminal feeds back the first channel information and the second channel information to the second radio base station, and the second radio base station normalizes the second channel information fed back from the radio terminal, while using the first channel information fed back from the radio terminal as a reference, and transmits the second radio signal in accordance with the normalized second channel information.

A sixth feature of the present invention is summarized in that, in the third feature of the present invention, the first channel information is information indicating a characteristic of a channel between each transmission antenna of the first radio base station and a corresponding reception antenna of the radio terminal, and the second channel information is information indicating a characteristic of a channel between each transmission antenna of the second radio base station and a corresponding reception antenna of the radio terminal.

A seventh feature of the present invention is summarized in that, in the third feature of the present invention, the first channel information is a first transmission antenna weight (transmission antenna weight 1) used to control at least one of a phase and an amplitude of the first radio signal, or an index indicating the first transmission antenna weight, and the second channel information is a second transmission antenna weight (transmission antenna weight 2) used to control at least one of a phase and an amplitude of the second radio signal, or an index indicating the second transmission antenna weight.

An eighth feature of the present invention is summarized in that, in the first feature of the present invention, the first radio base station is a radio base station located farther from the radio terminal than the second radio base station.

A ninth feature of the present invention is summarized in that, in the first feature of the present invention, the first radio base station is a radio base station having higher processing performance than the second radio base station.

A tenth feature of the present invention is summarized in that, in the first feature of the present invention, the first radio base station is a radio base station having lower processing performance than the second radio base station.

An eleventh feature of the present invention is summarized in that, in the first feature of the present invention, the first radio base station is a radio base station having a smaller fluctuation in a channel with the radio terminal than the second radio base station.

A twelfth feature of the present invention is summarized in that, in the first feature of the present invention, the first radio base station is a radio base station having a larger loss in a channel with the radio terminal than the second radio base station.

A thirteenth feature of the present invention is summarized as a radio terminal (radio terminal UE) comprising: a receiver (receiver 121) configured to receive a first radio signal (radio signal RS1) from a first radio base station (radio base station BS1) and to receive a second radio signal (radio signal RS2) from a second radio base station (radio base station BS2), at the same frequency and time as the first radio signal; and a transmitter (transmitter 122) configured to transmit feedback to the first radio base station and the second radio base station, wherein a time interval at which the transmitter provides the feedback to the first radio base station is longer than a time interval at which the transmitter provides the feedback to the second radio base station.

A fourteenth feature of the present invention is summarized as a radio communication system comprising: a first radio base station (radio base station BS1) configured to transmit a first radio signal (radio signal RS1) to a radio terminal (radio terminal UE) in accordance with feedback from the radio terminal; and a second radio base station (radio base station BS2) configured to transmit a second radio signal (radio signal RS2) to the radio terminal in accordance with feedback from the radio terminal, at the same frequency and time as the first radio signal, wherein one of the first radio base station and the second radio base station instructs the radio terminal to set a time interval for providing the feedback to the first radio base station to be longer than a time interval for providing the feedback to the second radio base station.

A fifteenth feature of the present invention is summarized as a radio communication method comprising the steps of: transmitting a first radio signal to a radio terminal (radio terminal UE) from a first radio base station (radio base station BS1) in accordance with feedback from the radio terminal; and transmitting a second radio signal to the radio terminal from a second radio base station (radio base station BS2) in accordance with feedback from the radio terminal, at the same frequency and time as the first radio signal, wherein a time interval at which the radio terminal provides the feedback to the first radio base station is longer than a time interval at which the radio terminal provides the feedback to the second radio base station.

According to the features of the present invention, it is possible to provide a radio communication system, a radio terminal and a radio communication method which can reduce the overhead associated with feedback while allowing coordinated base station MIMO communications to function normally.

DESCRIPTION OF THE EMBODIMENTS

Next, a description will be given of a first embodiment, a second embodiment, and other embodiments of the present invention with reference to the drawings. In the following description of the drawings in the embodiments, same or similar reference signs denote same or similar elements and portions.

First Embodiment

In the first embodiment, a description will be given of (1) Configuration of Radio Communication System, (2) Normalization Processing, (3) Base Station Selection Processing, (4) Operation of Radio Communication System, and (5) Effects of First Embodiment.
(1) Configuration of Radio Communication System
To begin with, a description will be given of (1.1) Overall Schematic Configuration, (1.2) Configuration of Radio Terminal UE, (1.3) Configuration of Radio Base Station BS1, and (1.4) Configuration of Radio Base Station BS2.
(1.1) Overall Schematic Configuration FIG. 1 is a schematic configuration diagram of a radio communication system 1 into which coordinated base station MIMO communications (coordinated multi-cell transmission/reception or coordinated multi-point transmission/reception (CoMP)) are introduced.

The radio communication system 1 has a configuration based on LTE-Advanced, which is considered as the fourth generation (4G) mobile phone system, for example. The radio communication system 1 employs the FDD (Frequency Division Duplex) scheme as a duplex communication system. Hereinafter, a description will be mainly given of coordinated base station MIMO communications in the downlink.

Figure 1:
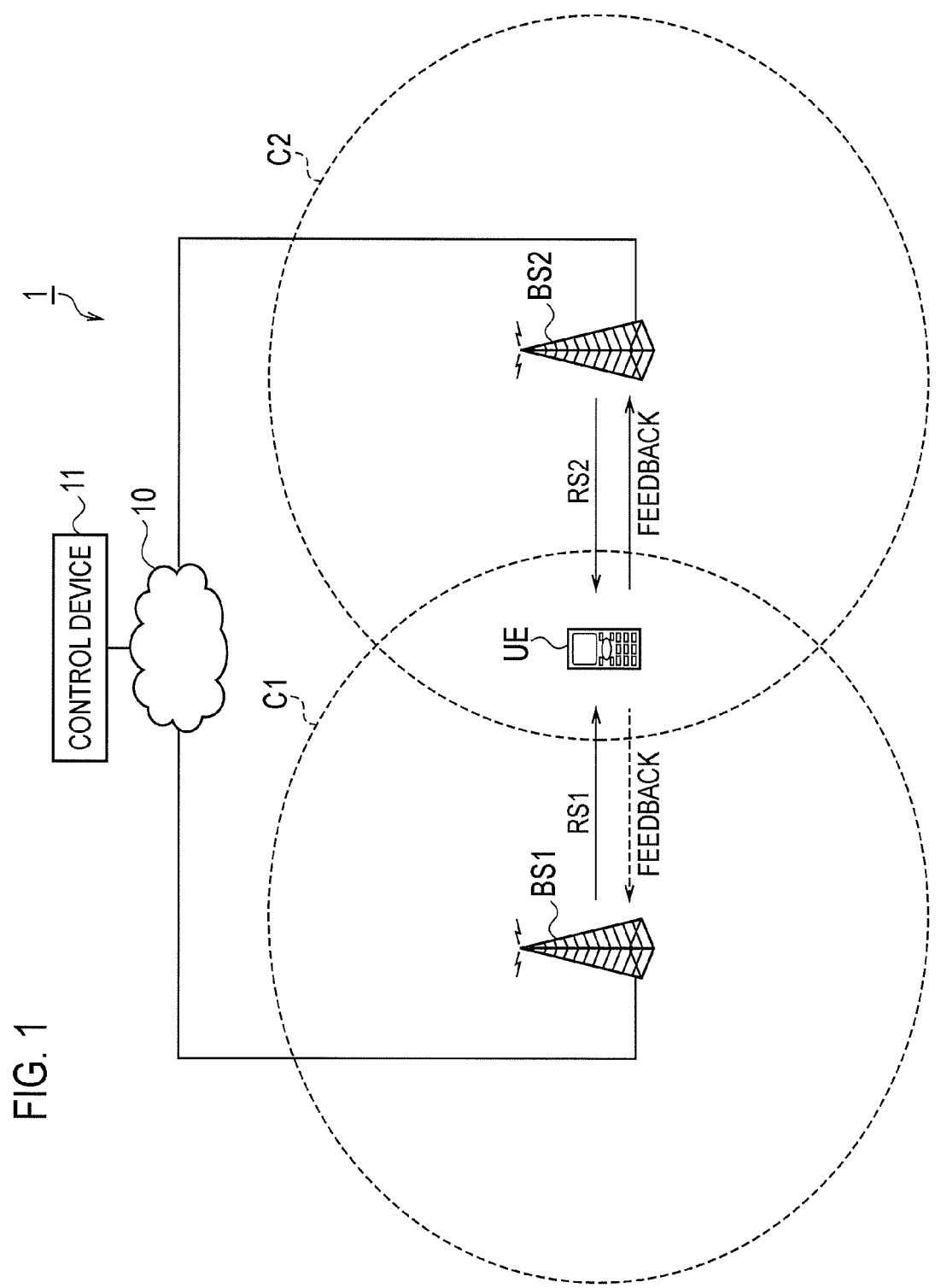
FIG. 1 is a schematic configuration diagram of a radio communication system according to a first embodiment and a second embodiment of the present invention.

As shown in FIG. 1, the radio communication system 1 has a radio base station BS1 (first radio base station), a radio base station BS2 (second radio base station), a radio terminal UE and a control device 11. The radio terminal UE is located in an overlapping portion of a cell C1 formed by the radio base station BS1 and a cell C2 formed by the radio base station BS2.

The radio base station BS1 and the radio base station BS2 may be a macrocell base station or a femtocell base station. The femtocell base station is a small radio base station mainly installed indoors.

The radio base station BS1 and the radio base station BS2 are connected to each other via a backhaul network 10 which is a wired communication network. The control device 11 provided in the backhaul network 10 and controls the radio base station BS1 and the radio base station BS2 via the backhaul network 10. The radio base station BS1 and the radio base station BS2, however, are capable of directly performing base-station communications without using the control device 11.

Closed-loop control is introduced into the coordinated base station MIMO communications in the radio communication system 1.

The radio base station BS1 transmits a radio signal RS1 (first radio signal) to the radio terminal UE in accordance with feedback from the radio terminal UE. The radio base station BS2 transmits a radio signal RS2 (second radio signal) to the radio terminal UE in accordance with feedback from the radio terminal UE at the same frequency and time as the radio signal RS1.

The radio base station BS1 performs weighting processing (called "pre-coding") of a transmission signal in accordance with feedback from the radio terminal UE and then transmits the radio signal RS1 including the weighted transmission signal. With the weighting processing, the phase and the amplitude of the transmission signal (radio signal RS1) are controlled for each transmission antenna of the radio base station BS1.

Likewise, the radio base station BS2 performs weighting processing of a transmission signal in accordance with feedback from the radio terminal UE and then transmits the radio signal RS2 corresponding to the weighted transmission signal. With the weighting processing, the phase and the amplitude of the transmission signal (radio signal RS2) are controlled for each transmission antenna of the radio base station BS2.

Here, a transmission signal sequence (also called a "stream") included in the radio signal RS1 transmitted by the radio base station BS1 and a transmission signal sequence included in the radio signal RS2 transmitted by the radio base station BS2 may be the same or different.

When the transmission signal sequence included in the radio signal RS1 and the transmission signal sequence included in the radio signal RS2 are the same (during single stream transmission), the reception quality is improved because of the diversity effect. As shown in FIG. 1, when the radio terminal UE is located at cell edges of the radio base station BS1 and the radio base station BS2, the reception quality is preferably improved by single stream transmission.

When the transmission signal sequence included in the radio signal RS1 and the transmission signal sequence included in the radio signal RS2 are different (during multi-stream transmission), the transmission speed is improved. When the radio base station BS1 or the radio base station BS2 is a femtocell base station, for example, and the radio terminal UE is located near the radio base station BS1 and the radio base station BS2, the transmission speed is preferably improved by multi-stream transmission.

The time intervals at each of which the radio terminal UE provides feedback to the radio base station BS1 (hereinafter, feedback interval 1) is longer than the time intervals at each of which the radio terminal UE provides feedback to the radio base station BS2 (hereinafter, feedback interval 2). The feedback interval 1 is an integral multiple of the feedback interval 2, for example.

In this embodiment, an assumption is made that the radio terminal UE provides feedback to the radio base station BS2 in each frame while the radio terminal UE provides feedback to the radio base station BS1 at a ratio of once in multiple frames, for example.

As described above, the radio terminal UE omits feedback to the radio base station BS1 in an appropriate manner. Hereinafter, a description will be given of a case where feedback to the radio base station BS1 is omitted in an appropriate manner, but the radio base station targeted for feedback omission in an appropriate manner is selectable. A method for selecting the radio base station targeted for feedback omission in an appropriate manner will be described later.

During the period in which the radio terminal UE omits feedback to the radio base station BS1 (hereinafter, feedback omission period), the radio terminal UE provides the radio base station BS2 with feedback based on channel information 1 in accordance with the channel characteristics from the radio base station BS1 to the radio terminal UE (first channel information) and channel information 2 in accordance with the channel characteristics from the radio base station BS2 to the radio terminal UE (second channel information). The channel characteristics mean parameters such as the attenuation amount, phase rotation amount, delay amount and the like received by a radio signal when the radio signal passes through the radio channel.

(1.2) Configuration of Radio Terminal UE

Figure 2:
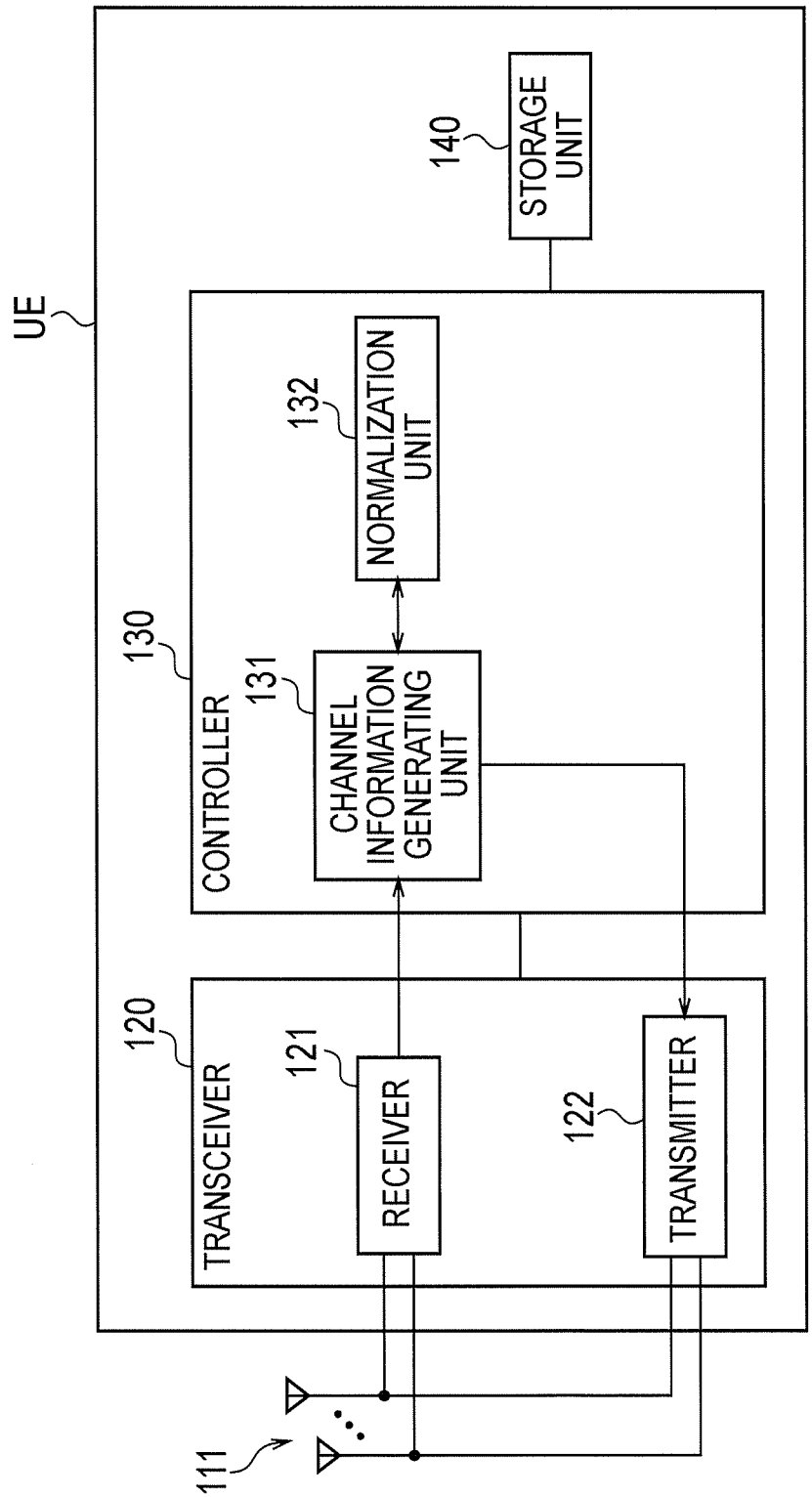
FIG. 2 is a block diagram showing a configuration of a radio terminal according to the first embodiment of the present invention.

FIG. 2 is a block diagram showing a configuration of the radio terminal UE.

Note that, hereinafter, a description will be mainly given of a portion relating to the present invention. Accordingly, it should be noted that there is a case where the radio terminal UE includes a component which is not illustrated or the description thereof is omitted (such as a power supply unit).

As shown in FIG. 2, the radio terminal UE includes multiple antennas 111, a transceiver 120, a controller 130 and a storage unit 140. In the example shown in FIG. 2, the radio terminal UE includes the multiple antennas 111, but the radio terminal UE does not always need to include multiple antennas, and may include only a single antenna 111.

The transceiver 120 is configured of a radio frequency (RF) circuit, a baseband (BB) circuit and the like, for example. The controller 130 is configured of a CPU, for example, and controls various functions included in the radio terminal UE. The storage unit 140 is configured of a memory, for example, and stores therein various types of information used in control or the like of the radio terminal UE.

The transceiver 120 has a receiver 121 and a transmitter 122. The controller 130 has a channel information generating unit 131 and a normalization unit 132.

The receiver 121 receives the radio signal RS1 from the radio base station BS1 and also receives the radio signal RS2 from the radio base station BS2. Note that, in a case of single stream transmission or the like, the receiver 121 preferably receives the radio signal RS1 and the radio signal RS2 in the same phase.

The channel information generating unit 131 performs processing to calculate a channel estimation value by using a reference signal (pilot signal) or the like included in the radio signal RS1 received by the receiver 121 (so called channel estimation). Here, the channel estimation value indicates the channel characteristics between each of the transmission antennas of the radio base station BS1 and a corresponding one of the reception antennas of the radio terminal UE (hereinafter, a channel estimation value 1).

The channel information generating unit 131 performs processing to calculate a channel estimation value by using a reference signal (pilot signal) or the like included in the radio signal RS2 received by the receiver 121. Here, the channel estimation value indicates the channel characteristics between each of the transmission antennas of the radio base station BS2 and a corresponding one of the reception antennas of the radio terminal UE (hereinafter, a channel estimation value 2).

The channel information generating unit 131 generates the channel information 1, which is information to be fed back to the radio base station BS1, on the basis of the channel estimation value 1. The channel estimation value 1 does not always need to be the channel information 1, and the channel information 1 may be a transmission antenna weight 1, which is used in the weighting processing performed by the radio base station BS1 (i.e., in control of at least one of the phase and the amplitude of the radio signal RS1), or an index indicating the transmission antenna weight 1 (called "PMI (Precoding Matrix Index)").

The channel information generating unit 131 generates the channel information 2, which is information to be fed back to the radio base station BS2, on the basis of the channel estimation value 2. The channel estimation value 2 does not always need to be the channel information 2, and the channel information 2 may be a transmission antenna weight 2, which is used in the weighting processing performed by the radio base station BS2 (i.e., in control of at least one of the phase and the amplitude of the radio signal RS2), or an index indicating the transmission antenna weight 2.

The normalization unit 132 normalizes the channel information 2 while using the channel information 1 as a reference during the feedback omission period. The normalization processing will be described later in detail.

The transmitter 122 transmits feedback to the radio base station BS1 at the feedback intervals 1 and also transmits feedback to the radio base station BS2 at the feedback intervals 2. In addition, the transmitter 122 feeds back the channel information 2 normalized by the normalization unit 132 to the radio base station BS2 during the feedback omission period.

(1.3) Configuration of Radio Base Station BS1

Figure 3:
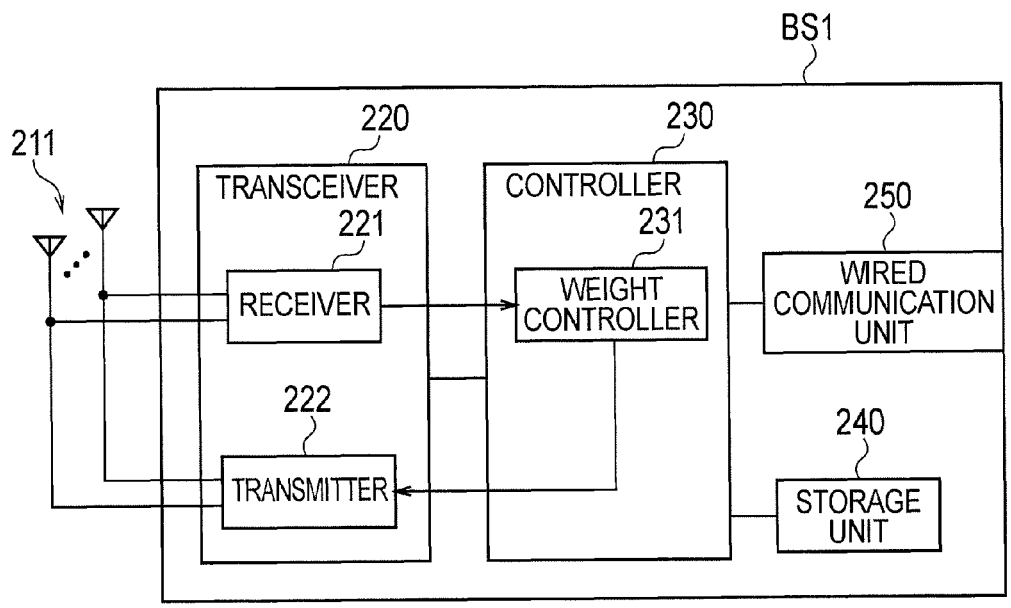
FIG. 3 is a block diagram showing a configuration of a radio base station (first radio base station) according to the first embodiment and the second embodiment of the present invention.

FIG. 3 is a block diagram showing a configuration of the radio base station BS1.

As shown in FIG. 3, the radio base station BS1 includes multiple antennas 211, a transceiver 220, a controller 230, a storage unit 240, and a wired communication unit 250. In the example shown in FIG. 3, the radio base station BS1 includes the multiple antennas 211, but the radio base station BS1 does not always need to include multiple antennas, and may include only a single antenna 211.

The transceiver 220 is configured of an RF circuit, a BB circuit and the like, for example. The controller 230 is configured of a CPU, for example, and controls various functions included in the radio base station BS1. The storage unit 240 is configured of a memory, for example, and stores therein various types of information used in control or the like of the radio base station BS1. The wired communication unit 250 communicates with the radio base station BS2 and the control device 11 via the backhaul network 10.

The transceiver 220 has a receiver 221 and a transmitter 222. The controller 230 has a weight controller 231.

When the radio terminal UE feeds back the channel information 1, the receiver 221 receives the fed back channel information 1.

The weight controller 231 controls the transmission antenna weight 1 used in transmission of the radio signal RS1. When the receiver 221 receives the channel information 1, the weight controller 231 updates the transmission antenna weight 1 in accordance with the channel information 1 and notifies the transmitter 222 of the updated transmission antenna weight 1.

During the period in which the receiver 221 receives no channel information 1, i.e., during the feedback omission period, the weight controller 231 does not update the transmission antenna weight 1 and notifies the transmitter 222 of the transmission antenna weight 1 that has been used by the weight controller 231 until that point of time.

The transmitter 222 weights (pre-codes) a transmission signal by using the transmission antenna weight 1 notified from the weight controller 231 and then transmits the radio signal RS1 including the weighted transmission signal.

(1.4) Configuration of Radio Base Station BS2

Figure 4:
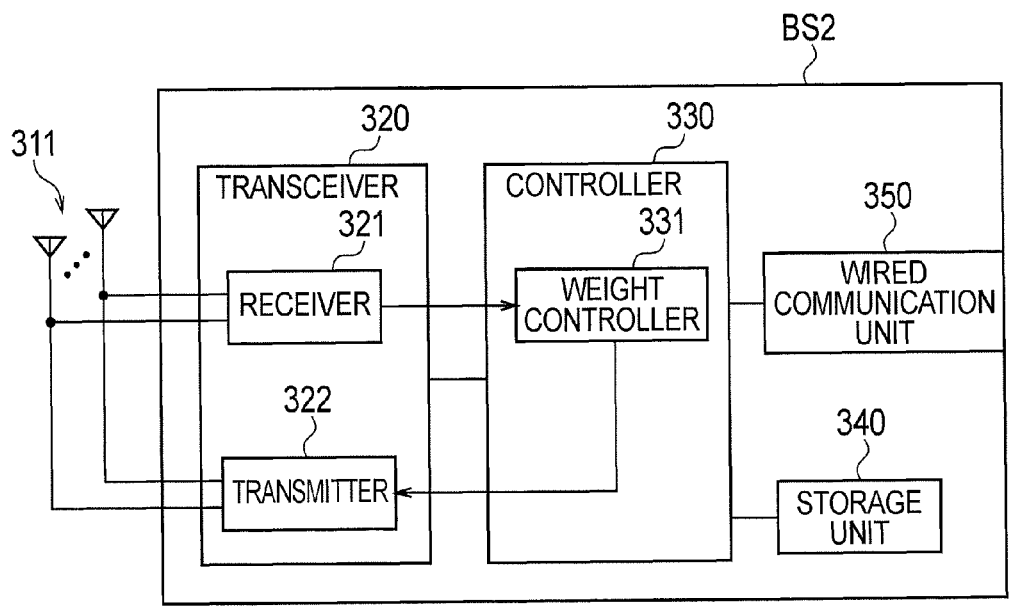
FIG. 4 is a block diagram showing a configuration of a radio base station (second radio base station) according to the first embodiment of the present invention.

FIG. 4 is a block diagram showing a configuration of the radio base station BS2.

As shown in FIG. 4, the radio base station BS2 includes multiple antennas 311, a transceiver 320, a controller 330, a storage unit 340, and a wired communication unit 350. In the example shown in FIG. 4, the radio base station BS2 includes the multiple antennas 211, but the radio base station BS2 does not always need to include multiple antennas, and may include only a single antenna 211.

The transceiver 320 is configured of an RF circuit, a BB circuit and the like, for example. The controller 330 is configured of a CPU, for example, and controls various functions included in the radio base station BS2. The storage unit 340 is configured of a memory, for example, and stores therein various types of information used in control or the like of the radio base station BS2. The wired communication unit 350 communicates with the radio base station BS1 and the control device 11 via the backhaul network 10.

The transceiver 320 has a receiver 321 and a transmitter 322. The controller 330 has a weight controller 331.

The receiver 321 receives the channel information 2 fed back from the radio terminal UE. The channel information 2 received by the receiver 321 may be normalized or not normalized.

The weight controller 331 controls the transmission antenna weight 2 used in transmission of the radio signal RS2. The weight controller 331 updates the transmission antenna weight 2 in accordance with the channel information 2 received by the receiver 321 and notifies the transmitter 322 of the updated transmission antenna weight 2.

The transmitter 322 weights (pre-codes) a transmission signal by using the transmission antenna weight 2 notified from the weight controller 331 and then transmits the radio signal RS2 including the weighted transmission signal.

(2) Normalization Processing

Figure 5:
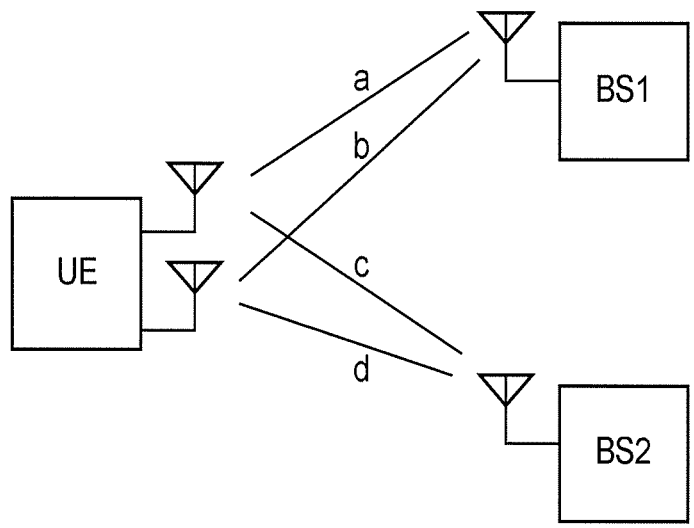
FIG. 5 is a diagram for describing normalization processing performed by a normalization unit according to the first embodiment of the present invention (part 1).
Figure 5:
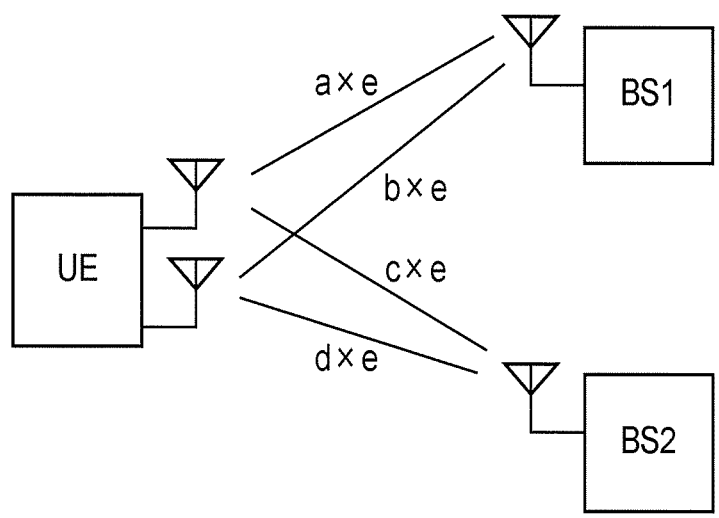

Next, the normalization processing performed by the normalization unit 132 will be described with reference to FIG. 5 and FIG. 6. Firstly, a description will be given of a case where the channel information 1 is the channel estimation value 1 and the channel information 2 is the channel estimation value 2.

The channel estimation value has a value for each antenna (each combination of transmission and reception antennas), and even when the value itself is changed, the value can be appropriately processed on the reception side (signal isolation or the like) as long as the relative relation of the values is maintained. For example, the channel estimation values 1 ($a$, $b$) and the channel estimation values 2 ($c$, $d$) shown in FIG. 5($a$) are converted by multiplying all of the channel estimation values by a constant e ($a \times e$, $b \times e$, $c \times e$, $d \times e$) as shown in FIG. 5($b$). Even in this case, the relation between the phases of the channel estimation values 1 and the channel estimation values 2 is maintained, and the same phase relation is kept. Thus, there is no problem in particular in this case.

Figure 6:
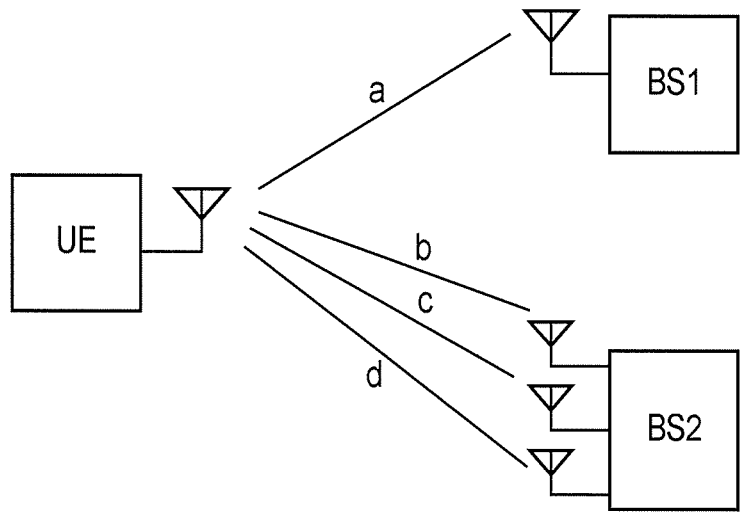
FIG. 6 is a diagram for describing normalization processing performed by a normalization unit according to the first embodiment of the present invention (part 2).
Figure 6:
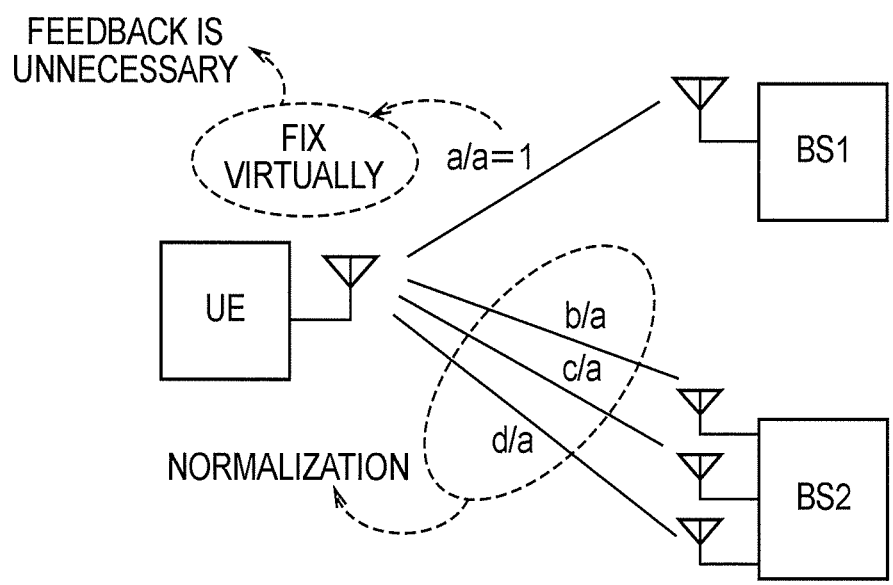

In this respect, as shown in FIG. 6($a$), the channel estimation value 1 ($a$) and the channel estimation values 2 ($b, c, d$) each of which needs to be fed back are converted by dividing the channel estimation values 2 by the channel estimation value 1 as shown in FIG. 6($b$). To put it more specifically, the normalization through division resulting in the path estimation value 1 ($a/a$)=(1) and the channel estimation values 2 ($b/a$, $c/a$, $d/a$) makes it possible to virtually always fix the channel estimation value 1 to be (1), and to eliminate a need for feedback to the radio base station BS1.

In this example, the normalization is performed by dividing the channel estimation values 2 by the channel estimation value 1, but other normalization methods may be used as long as the normalization is performed by a calculation method that keeps the relative relation between the channel estimation value 1 and the channel estimation values 2. Thus, the normalization may be performed by subtracting the channel estimation value 1 from each of the channel estimation values 2, for example.

Meanwhile, assume a case where the channel information 1 is the transmission antenna weight 1 or its index and the channel information 2 is the transmission antenna weight 2 or its index. In this case, in addition to the aforementioned processing, a transmission antenna weight 2 corresponding to the normalized channel estimation value 2 is selected from candidates of the transmission antenna weight 2 (called code book), for example, and then, the selected transmission antenna weight 2 or its index is fed back to the radio base station BS2.

Alternatively, the following method may be employed as a method for selecting an optimum PMI from a list (code book) of the indices of transmission antenna weights 2 (termed as PMIs, herein). To put it more specifically, a reception SNR using a PMI in the list is calculated for each PMI on the basis of the channel estimation value 1 and the channel estimation values 2, and a PMI corresponding to the largest reception SNR among the calculated reception SNRs is selected as the optimum PMI. If there are few SNRs in the list, such a method is effective. When this method is employed, the normalization unit 132 selects (searches for) a PMI to be fed back to the radio base station BS2. Here, the PMI allows the reception SNR to be the largest under a condition that the radio base station BS1 is assumed to perform fixed transmission, on the basis of the channel estimation value 1 and the channel estimation values 2.

Note that, the radio base station BS1 uses a single transmission antenna in the aforementioned example, but the same processing can be applied even when the number of transmission antennas of the radio base station BS1 is two or more.

(3) Base Station Selection Processing

Next, a description will be given of base station selection processing to select a radio base station (radio base station BS1) targeted for feedback omission in an appropriate manner. The base station selection processing may be performed by any one of the radio terminal UE, the radio base station BS1, the radio base station BS2 and the control device 11.

As the base station selection processing, any of Selection Methods 1 to 5 below is usable, for example. Here, it is not necessary to fixedly use any of Selection Methods 1 to 5. Selection Methods 1 to 5 may be appropriately switched from one to another and used in accordance with the conditions of the radio terminal UE, the radio base station BS1 and the radio base station BS2.

(Selection Method 1)

In Selection Method 1, a radio base station located far from the radio terminal UE is selected as the radio base station BS1 and a radio base station located near the radio terminal UE is selected as the radio base station BS2. Thus, the radio terminal UE always provides feedback to the radio base station BS2 located near the radio terminal UE and omits, in an appropriate manner, feedback to the radio base station BS1 located far from the radio terminal UE. Accordingly, the transmission power for feedback can be reduced, and the interference amount can be reduced as well. Selection Method 1 is preferred if the remaining battery level of the radio terminal UE is low or the like. Note that, although Selection Method 1 needs information on the distance between the radio terminal UE and the radio base station BS1 and information on the distance between the radio terminal UE and the radio base station BS2, the information on the distances can be obtained by using a GPS or the like provided in the radio terminal UE.

(Selection Method 2)

In Selection Method 2, a radio base station having high processing performance (macrocell base station, to be more specific) is selected as the radio base station BS1 and a radio base station having low processing performance (femtocell base station, to be more specific) is selected as the radio base station BS2. A femtocell base station normally exists near the radio terminal UE. Thus, the radio terminal UE always provides feedback to the radio base station BS2 located near the radio terminal UE (femtocell base station) and omits, in an appropriate manner, feedback to the radio base station BS1 located far from the radio terminal UE (macrocell base station). Selection Method 2 is effective when no GPS or the like is provided in the radio terminal UE, for example.
(Selection Method 3)

In Selection Method 3, a radio base station having low processing performance (femtocell base station, to be more specific) is selected as the radio base station BS1 and a radio base station having high processing performance (macrocell base station, to be more specific) is selected as the radio base station BS2. A high transmission speed can be obtained by causing the radio base station having low processing performance to perform weight fixed constant transmission and causing the radio base station having high processing performance to perform multi-stream transmission using multiple antennas. Thus, Selection Method 3 is effective when a high transmission speed is required, or the remaining battery level of the radio terminal UE is high.
(Selection Method 4)

In Selection Method 4, a radio base station having a small channel fluctuation with the radio terminal UE is selected as the radio base station BS1 and a radio base station having a large channel fluctuation with the radio terminal UE is selected as the radio base station BS2. This is because the channel fluctuation with the radio base station BS1 is preferably small since the radio base station BS1 performs weight fixed constant transmission. Selection Method 4 is effective when there is a large difference in the channel fluctuation between the radio terminal UE and each radio base station.
(Selection Method 5)

Figure 7:
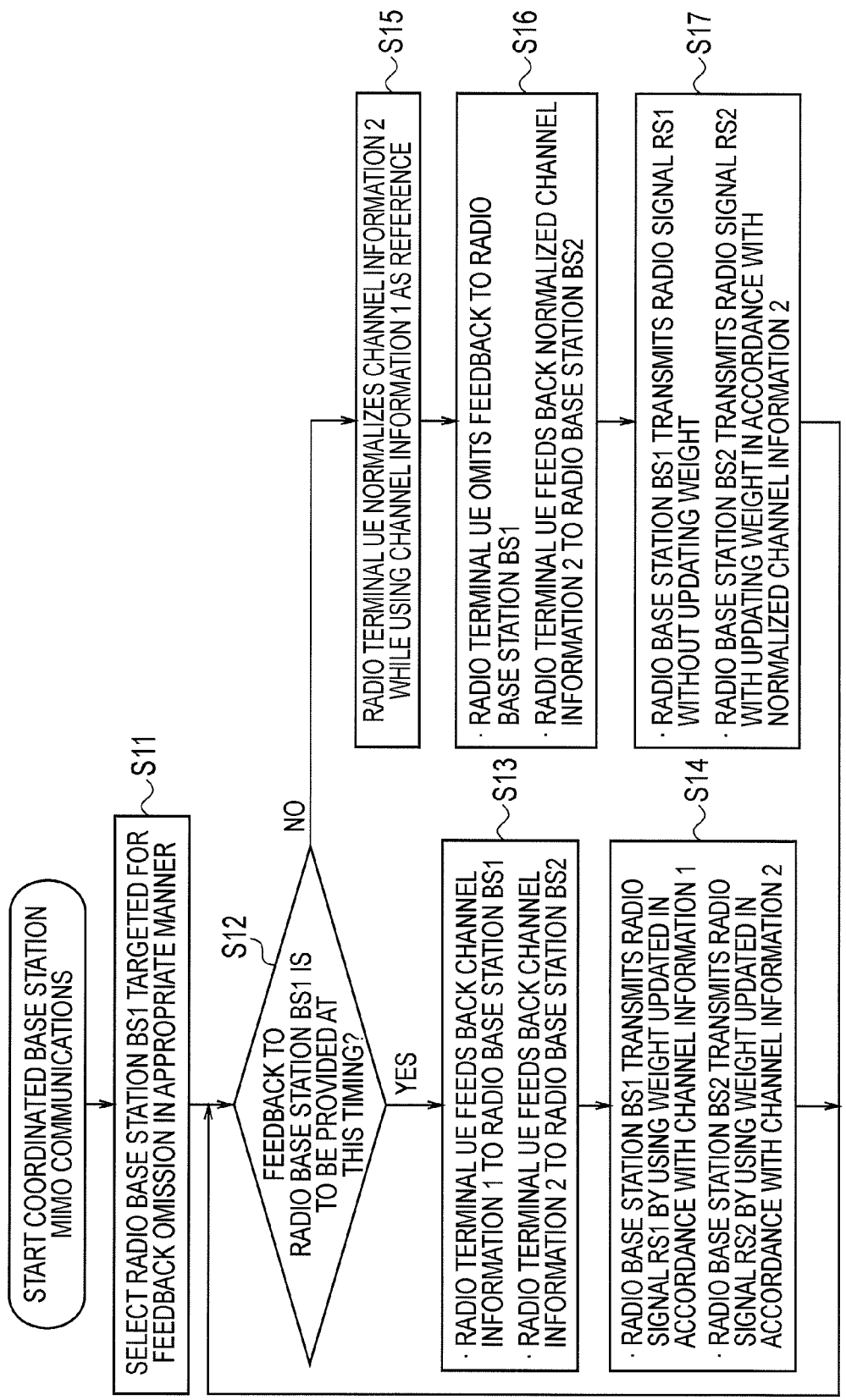
FIG. 7 is a flowchart showing an operation of the radio communication system according to the first embodiment of the present invention.

In Selection Method 5, a radio base station having a large channel loss with the radio terminal UE is selected as the radio base station BS1 and a radio base station having a small channel loss with the radio terminal UE is selected as the radio base station BS2. The channel loss is measured as a difference between the transmission power in the radio base station and the reception power in the radio terminal UE, and reflects the distance between the terminal and the base station. For this reason, the radio terminal UE always provides feedback to the radio base station BS2 located near the radio terminal UE and omits, in an appropriate manner, feedback to the radio base station BS1 located far from the radio terminal UE. The channel loss is used for another application such as transmission power control, and is easily obtainable. Thus, the existing system configuration can be effectively utilized with Selection Method 5.
(4) Operation of Radio Communication System Next, a description will be given of an operation of the radio communication system 1 according to the first embodiment with reference to FIG. 7.

When coordinated base station MIMO communications start, in step S11, a radio base station BS1 targeted for feedback omission in an appropriate manner is selected by the processing described in (3) Base Station Selection Processing above. When a device other than the radio terminal UE (radio base station BS1, radio base station BS2 or control device 11) selects the radio base station BS1 targeted for feedback omission in an appropriate manner, the device instructs the radio terminal UE to omit feedback on the channel information 1 to the radio base station BS1 in an appropriate manner.

If feedback to the radio base station BS1 is to be provided at this timing (step S12; YES), the transmitter 122 of the radio terminal UE feeds back the channel information 1 to the radio base station BS1 and feeds back the channel information 2 to the radio base station BS2 in step S13. The receiver 221 of the radio base station BS1 receives the channel information 1. The receiver 321 of the radio base station BS2 receives the channel information 2.

In step S14, the transmitter 222 of the radio base station BS1 transmits the radio signal RS1 to the radio terminal UE by using the transmission antenna weight 1 updated by the weight controller 231 in accordance with the channel information 1 received by the receiver 221. The transmitter 322 of the radio base station BS2 transmits the radio signal RS2 to the radio terminal UE by using the transmission antenna weight 2 updated by the weight controller 331 in accordance with the channel information 2 received by the receiver 321.

Meanwhile, if feedback to the radio base station BS1 is to be omitted at this timing (step S12; NO), the normalization unit 132 of the radio terminal UE normalizes the channel information 2 while using the channel information 1 as a reference in step S15 by the processing described in (2) Normalization Processing above.

In step S16, the transmitter 122 of the radio terminal UE omits feedback on the channel information 1 to the radio base station BS1 but feeds back the channel information 2 normalized by the normalization unit 132 to the radio base station BS2. The receiver 321 of the radio base station BS2 receives the normalized channel information 2. The weight controller 331 of the radio base station BS2 notifies the transmitter 322 of the transmission antenna weight 2 updated in accordance with the channel information 2 received by the receiver 321.

In step S17, the transmitter 322 of the radio base station BS2 weights a transmission signal by using the updated transmission antenna weight 2 notified by the weight controller 331, and transmits the radio signal RS2 including the weighted transmission signal. In addition, the transmitter 222 of the radio base station BS1 weights a transmission signal by using the transmission antenna weight 1, which is not updated, and transmits the radio signal RS1 including the weighted transmission signal.
(5) Effects of First Embodiment The radio terminal UE omits, in an appropriate manner, feedback to the radio base station BS1. Thus, the overhead associated with the feedback can be reduced. To put it differently, during the feedback omission period, the radio terminal UE needs to establish a feedback control channel only with the radio base station BS2. Thus, the amount of consumption of radio resources can be reduced in the uplink.

In the first embodiment, the radio terminal UE normalizes the channel information 2 while using the channel information 1 as a reference and feeds back the normalized channel information 2 to the radio base station BS2 during the feedback omission period. Accordingly, the radio base station BS2 transmits the radio signal RS2 in accordance with the channel information 2 whose relative relation with the channel information 1 is maintained. Thus, it is possible to function the coordinated base station MIMO communications normally even during the feedback omission period.

Second Embodiment

Figure 8:
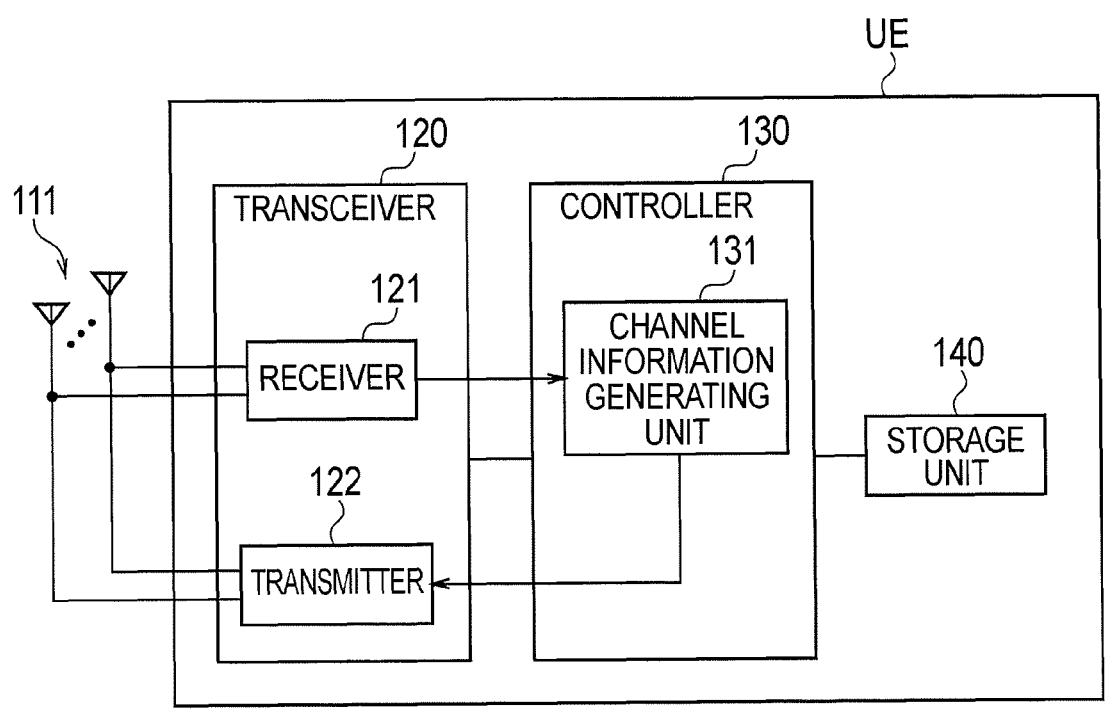
FIG. 8 is a block diagram showing a configuration of a radio terminal according to a second embodiment of the present invention.
Figure 9:
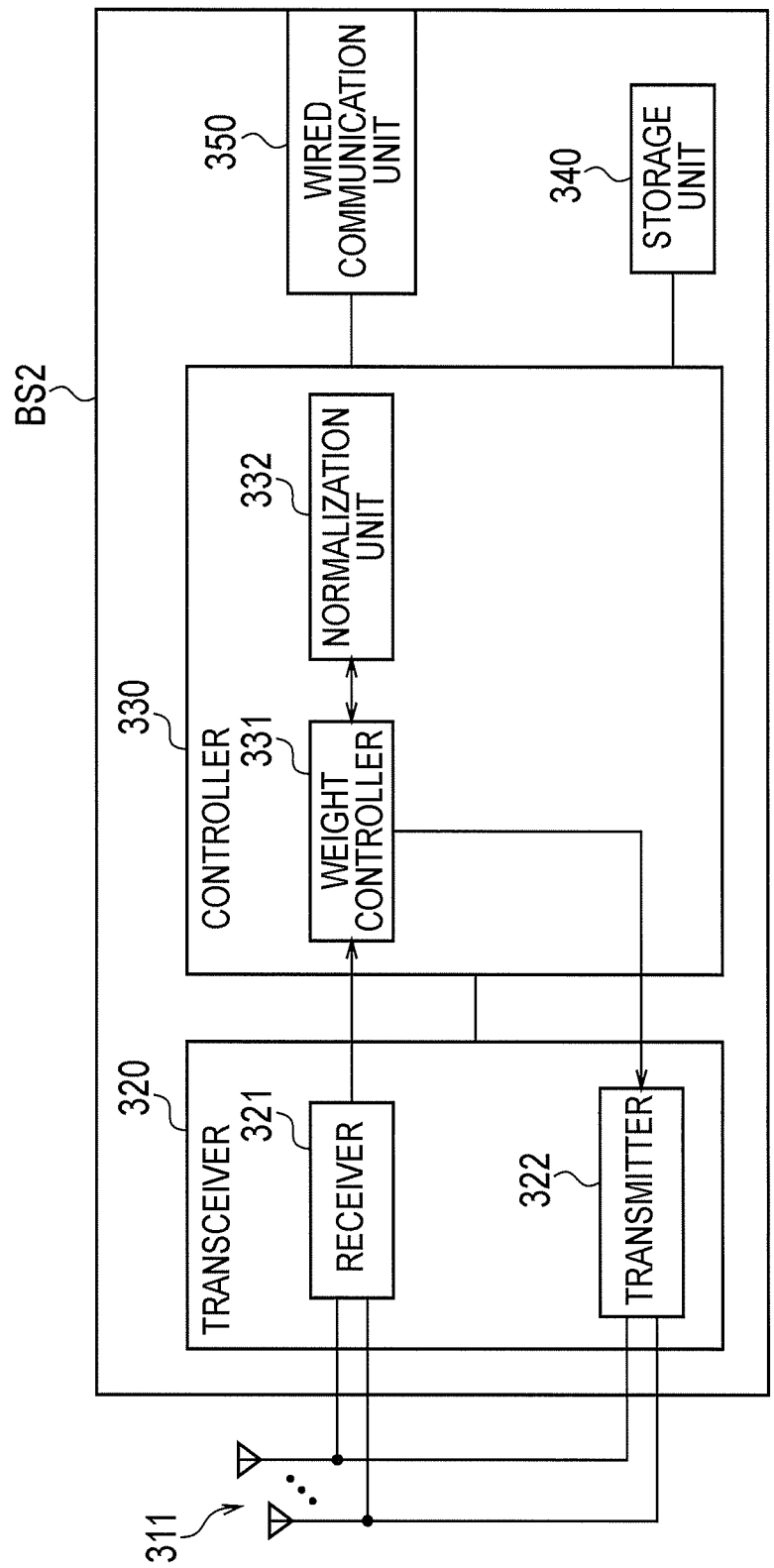
FIG. 9 is a block diagram showing a configuration of a radio base station (second radio base station) according to the second embodiment of the present invention.

While the radio terminal UE normalizes the channel information in the first embodiment, the radio base station BS2 normalizes the channel information in the second embodiment. Hereinafter, a description will be given of (1) Configuration of Radio Communication System, (2) Operation of Radio Communication System and (3) Effects of Second Embodiment. Here, a description will be given of differences from the first embodiment.
(1) Configuration of Radio Communication System FIG. 8 is a block diagram showing a configuration of a radio terminal UE according to a second embodiment. FIG. 9 is a block diagram showing a configuration of a radio base station BS2 according to the second embodiment.

As shown in FIG. 8, the radio terminal UE does not include the normalization unit 132, which is described in the first embodiment. Meanwhile, as shown in FIG. 9, the radio base station BS2 includes a normalization unit 332 having the same functions as the normalization unit 132, which is described in the first embodiment. The other parts of the configuration are the same as in the case of the first embodiment.

(2) Operation of Radio Communication System

Figure 10:
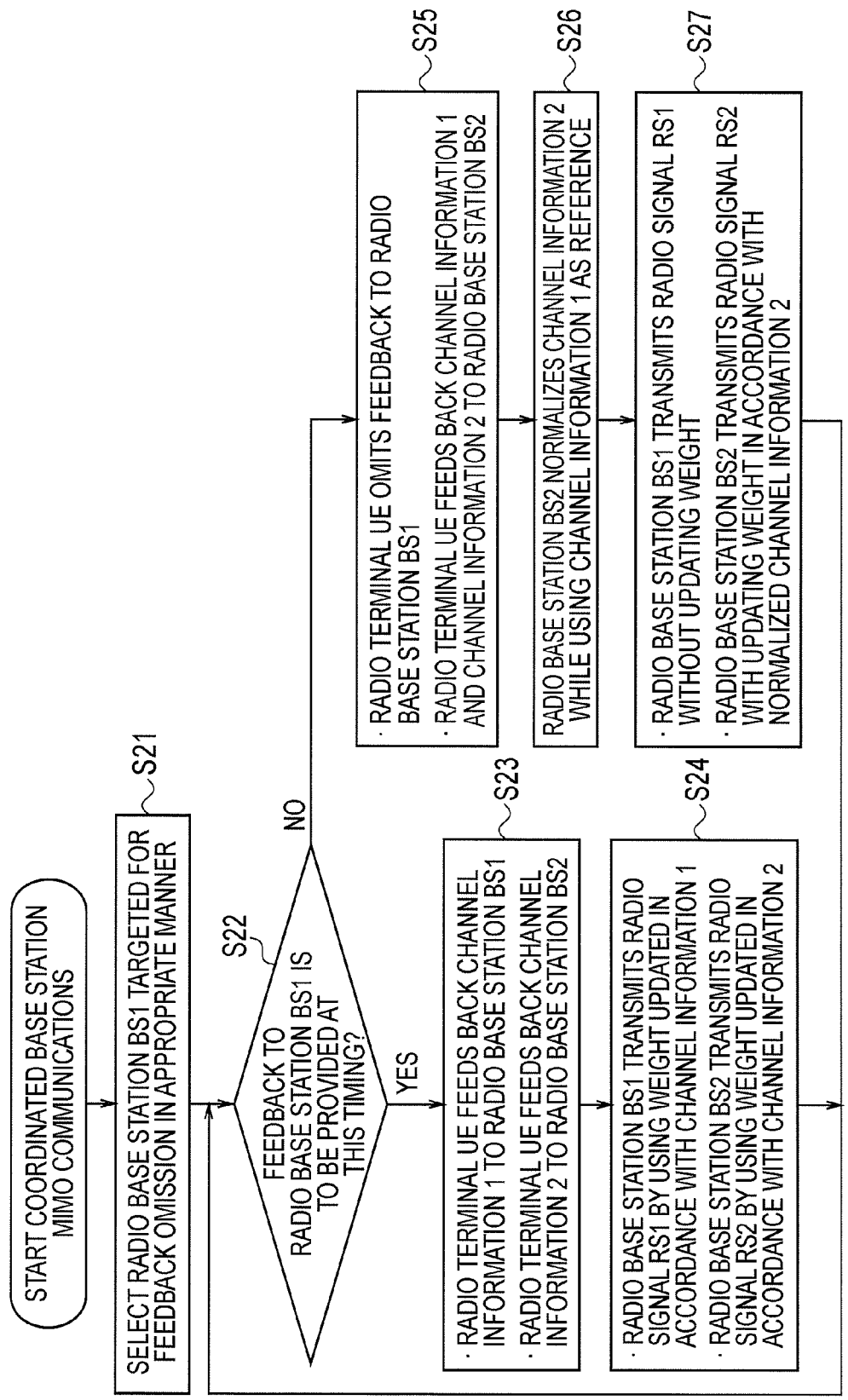
FIG. 10 is a flowchart showing an operation of the radio communication system according to the second embodiment of the present invention.

Next, a description will be given of an operation of the radio communication system 1 according to the second embodiment with reference to FIG. 10. Here, since the processing in steps S21 to S24 is the same as in the case of the first embodiment, the processing in steps S25 to S27 will be described.

In step S25, the channel information generating unit 131 of the radio terminal UE generates the channel information 1 and the channel information 2. Then, the transmitter 122 of the radio terminal UE omits feedback on the channel information 1 to the radio base station BS1 but feeds back the channel information 1 and the channel information 2, which are generated by the channel information generating unit 131, to the radio base station BS2. The receiver 321 of the radio base station BS2 receives the fed back channel information 1 and channel information 2.

In step S26, the normalization unit 332 of the radio base station BS2 normalizes the channel information 2 while using the channel information 1 as a reference by the same processing as the processing described in (2) Normalization Processing in the first embodiment. The weight controller 331 of the radio base station BS2 notifies the transmitter 322 of the transmission antenna weight 2 updated in accordance with the channel information 2 normalized by the normalization unit 332.

In step S27, the transmitter 322 of the radio base station BS2 weights a transmission signal by using the updated transmission antenna weight 2 notified by the weight controller 331, and transmits the radio signal RS2 including the weighted transmission signal. In addition, the transmitter 222 of the radio base station BS1 weights a transmission signal by using the transmission antenna weight 1, which is not updated, and constantly transmits the radio signal RS1 including the weighted transmission signal.

(3) Effects of Second Embodiment

In the second embodiment, the radio terminal UE omits feedback to the radio base station BS1 but feeds back the channel information 1 and the channel information 2 to the radio base station BS2 during the feedback omission period. In addition, the radio base station BS2 normalizes the channel information 2, which is fed back from the radio terminal UE, while using the channel information 1 as a reference, which is also fed back from the radio terminal UE, and updates the transmission antenna weight 2 in accordance with the normalized channel information 2.

Thus, the radio terminal UE needs to establish a feedback control channel only with the radio base station BS2 during the feedback omission period. Accordingly, the amount of consumption of radio resources can be reduced in the uplink. In addition, the radio base station BS2 transmits the radio signal RS2 in accordance with the channel information 2 whose relative relation with the channel information 1 is maintained. Thus, it is possible to function the coordinated base station MIMO communications normally even during the feedback omission period.

Other Embodiments

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

In the aforementioned embodiments, the channel information to be fed back is the channel estimation value, the transmission antenna weight or its index, but the channel information is not limited to these values and may be a channel prediction value which is calculated on the basis of the channel estimation value and which shows a future channel characteristic.

In the aforementioned second embodiment, the channel information 1 and the channel information 2 are fed back to the radio base station BS2. Thus, the radio base station targeted for feedback omission in an appropriate manner can be switched from the radio base station BS1 to the radio base station BS2 after the channel information 1 and the channel information 2 are transferred from the radio base station BS2 to the radio base station BS1.

As described above, it should be understood that the present invention includes various embodiments which are not described herein. Accordingly, the technical scope of the present invention should be determined only by the matters to define the invention in the scope of claims regarded as appropriate based on the description.

Note that the entire content of Japanese Patent Application No. 2009-128169 (filed on May 27, 2009) is incorporated herein by reference.

INDUSTRIAL APPLICABILITY

As described above, the radio communication system, the radio terminal and the radio communication method according to the present invention can reduce the overhead associated with feedback while allowing coordinated base station MIMO communications to function normally. Thus, the radio communication system, the radio terminal and the radio communication method are useful in radio communications such as mobile communications.

The invention claimed is:

1. A radio communication system comprising:
a radio terminal;
a first radio base station configured to transmit a first radio signal to the radio terminal in accordance with feedback from the radio terminal; and
a second radio base station configured to transmit a second radio signal to the radio terminal in accordance with feedback from the radio terminal, at the same frequency and time as the first radio signal, wherein
a time interval at which the radio terminal provides the feedback to the first radio base station is longer than a time interval at which the radio terminal provides the feedback to the second radio base station.

2. The radio communication system according to claim 1, wherein
the first radio base station updates a first transmission antenna weight, used to control at least one of a phase and an amplitude of the first radio signal, in accordance with the feedback from the radio terminal,
the second radio base station updates a second transmission antenna weight, used to control at least one of a phase and an amplitude of the second radio signal, in accordance with the feedback from the radio terminal, and
a time interval at which the first radio base station updates the first transmission antenna weight is longer than a time interval at which the second radio base station updates the second transmission antenna weight.

3. The radio communication system according to claim 1, wherein
during a period for which feedback to the first radio base station is omitted, the radio terminal provides the second radio base station with feedback based on first channel information in accordance with a characteristic of a channel from the first radio base station to the radio terminal, and second channel information in accordance with a characteristic of a channel from the second radio base station to the radio terminal.

4. The radio communication system according to claim 3, wherein
during the period for which feedback to the first radio base station is omitted, the radio terminal normalizes the second channel information by using the first channel information as a reference and feeds back the normalized second channel information to the second radio base station.

5. The radio communication system according to claim 3, wherein
during the period for which feedback to the first radio base station is omitted, the radio terminal feeds back the first channel information and the second channel information to the second radio base station, and
the second radio base station normalizes the second channel information fed back from the radio terminal, while using the first channel information fed back from the radio terminal as a reference, and transmits the second radio signal in accordance with the normalized second channel information.

6. The radio communication system according to claim 3, wherein
the first channel information is information indicating a characteristic of a channel between each transmission antenna of the first radio base station and a corresponding reception antenna of the radio terminal, and
the second channel information is information indicating a characteristic of a channel between each transmission antenna of the second radio base station and a corresponding reception antenna of the radio terminal.

7. The radio communication system according to claim 3, wherein
the first channel information is a first transmission antenna weight used to control at least one of a phase and an amplitude of the first radio signal, or an index indicating the first transmission antenna weight, and
the second channel information is a second transmission antenna weight used to control at least one of a phase and an amplitude of the second radio signal, or an index indicating the second transmission antenna weight.

8. The radio communication system according to claim 1, wherein
the first radio base station is a radio base station located farther from the radio terminal than the second radio base station.

9. The radio communication system according to claim 1, wherein
the first radio base station is a radio base station having higher processing performance than the second radio base station.

10. The radio communication system according to claim 1, wherein
the first radio base station is a radio base station having lower processing performance than the second radio base station.

11. The radio communication system according to claim 1, wherein
the first radio base station is a radio base station having a smaller fluctuation in a channel with the radio terminal than the second radio base station.

12. The radio communication system according to claim 1, wherein
the first radio base station is a radio base station having a larger loss in a channel with the radio terminal than the second radio base station.

13. A radio terminal comprising:
a receiver configured to receive a first radio signal from a first radio base station and to receive a second radio signal from a second radio base station, at the same frequency and time as the first radio signal; and
a transmitter configured to transmit feedback to the first radio base station and the second radio base station, wherein
a time interval at which the transmitter provides the feedback to the first radio base station is longer than a time interval at which the transmitter provides the feedback to the second radio base station.

14. A radio communication system comprising:
a first radio base station configured to transmit a first radio signal to a radio terminal in accordance with feedback from the radio terminal; and
a second radio base station configured to transmit a second radio signal to the radio terminal in accordance with feedback from the radio terminal, at the same frequency and time as the first radio signal, wherein
one of the first radio base station and the second radio base station instructs the radio terminal to set a time interval for providing the feedback to the first radio base station to be longer than a time interval for providing the feedback to the second radio base station.

15. A radio communication method comprising the steps of:
transmitting a first radio signal to a radio terminal from a first radio base station in accordance with feedback from the radio terminal; and
transmitting a second radio signal to the radio terminal from a second radio base station in accordance with feedback from the radio terminal, at the same frequency and time as the first radio signal, wherein
a time interval at which the radio terminal provides the feedback to the first radio base station is longer than a time interval at which the radio terminal provides the feedback to the second radio base station.

* * * * *